Oct. 12, 1965 L. N. LEA 3,211,460

PHONOGRAPH APPARATUS

Original Filed Oct. 2, 1961

INVENTOR,
LAWRENCE N. LEA,
BY
[signature]
ATTORNEY.

3,211,460
Patented Oct. 12, 1965

1

3,211,460
PHONOGRAPH APPARATUS

Lawrence N. Lea, 1683 University Ave., Bronx, N.Y.

Original application Oct. 2, 1961, Ser. No. 142,312, now Patent No. 3,168,318, dated Feb. 2, 1965. Divided and this application Dec. 17, 1964, Ser. No. 419,006
8 Claims. (Cl. 274—39)

This is a division of application Serial No. 142,312 filed October 2, 1961, now Patent No. 3,168,318.

The present invention relates to phonograph apparatus and contemplates the use of a revolving record which has successive lanes of sound track whose subject matter musically and/or intellectually, may all be of one topic or on different topics respectively.

An object of this invention is to provide a novel and improved phonograph apparatus of the character mentioned, which is adapted to "play" one lane at a time and stop at the end of each lane, for it requires that an element be moved, as for instance that a button be pushed to commence the playing of each lane respectively. When such push is given, that lane which is next to the stylus towards the end of the record, is the one which will be played.

Another object of this invention is to provide a novel and improved phonograph apparatus of the kind described, provided with means whereby when a particular button is pushed at the end of play of any lane, the pick-up arm is automatically lifted off the record and moved to the start of the record.

A further object thereof is to provide a novel and improved phonograph apparatus of the type set forth, in which any lane already played, can be selected and replayed. Then, if desired, succeeding lanes next to the very last lane played, can be played one at a time.

Another object of this invention is to provide a novel and improved phonograph apparatus of the kind described, having a selector means to choose the lane to be played, which may be any lane on the record. Then, if desired, succeeding lanes next to the very last lane played, can be played one at a time.

A further object thereof is to provide that the spiral spring of the motor shall never run down to materially slow up the required record speed to have proper operation.

Another object is to provide novel and improved constructions in a phonograph apparatus of the character set forth, which are adaptable to devices of this class regardless of what the motive power is to rotate the record.

Still a further object of this invention is to provide a novel and improved phonograph apparatus having the mentioned attributes, which is simple in construction, easy to understand, simple to manipulate and efficient in carrying out the purposes and functions for which it is designed.

Other objects and advantages will become apparent as this disclosure proceeds.

For the practice of this invention, one form it may assume is to have a wind-up spring motor arranged to rotate a record having successive sound lanes as heretofore mentioned. A pick-up arm is pivotally mounted so that its associated stylus can transverse the record; such arm being resilient so that the stylus bears with sufficient pressure against the record in a sound groove and said arm can be flexed so that the stylus is off the record. The shaft directly connected to the inner end of the spiral spring of the motor, so that such shaft revolves as such spring unwinds, has fast thereon a gear having a series of prongs in spaced relation thereon in a circle about such spiral so that when such spring has

2 unwound to a predetermined extent and become enlarged, it will contact said prongs and thus be prevented from further unwinding. These prongs also serve as part of the brake means to halt the motor, for there is a spring-biased movable dog in their path, provided with a push button to shift it out of their path, to permit the motor to run again. The permitted run between said prongs, shifts stylus position across a lane on the record. The distance between two successive prongs will of course determine the length of the sound groove in the lane played. There is a push-button operated resetting means to lift the pick-up arm off the record and restore it to the beginning of the first lane on the record. A turn-by-knob adjustable stop means determines the extent the pick-up arm may be shifted towards the start of the record and hence serves to locate the pick-up arm at the commencement of any lane that has already been played in any run of the device. This stop means is the selector and is associated with cam means to lift the pick-up arm off the record so as not to mar it, thus permitting the setting so that any lane can be chosen for play.

In the accompanying drawing forming part of this specification, similar characters of reference indicate corresponding parts in all the views.

Figures 1, 2, 3, 4, 5, 6, 7:
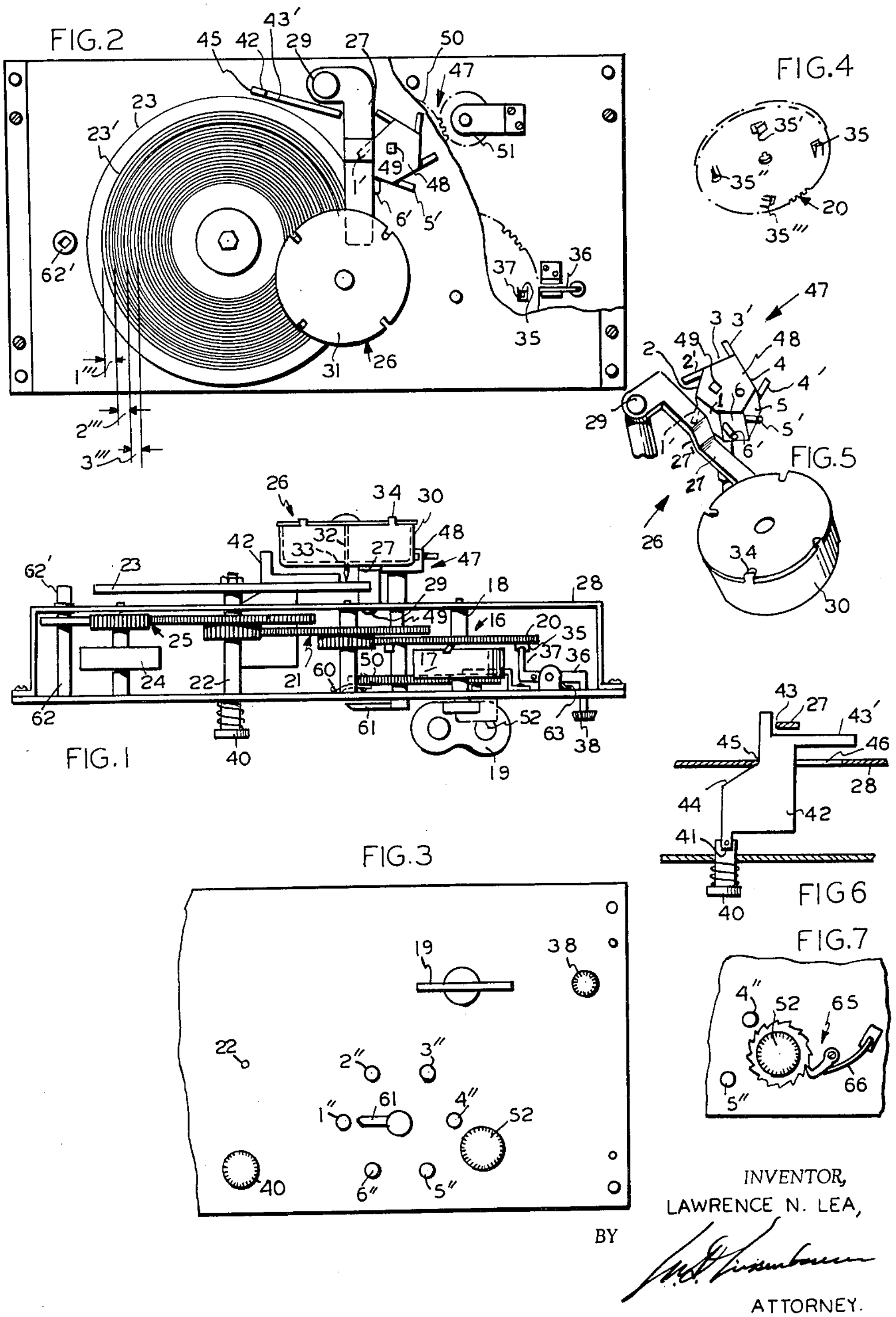
FIG. 1 is an elevational view of a phonograph apparatus embodying the teachings of this invention.
FIG. 2 is a top plan view thereof with part broken away to expose certain components of the mechanism.
FIG. 3 is a fragmentary bottom view of FIG. 1.
FIG. 4 is a perspective view showing the gear in this embodiment, which has spaced prongs struck therefrom to serve as part of the brake means and to limit the extent to which the motor's spring is allowed to unwind.
FIG. 5 is a fragmentary perspective view of the pick-up arm, commonly known as the tone arm, associated with the selector means.
FIG. 6 is a fragmentary view in elevation, showing the means for resetting the pick-up arm to a start position.
FIG. 7 is a fragmentary top plan view showing a slight modification in the selector means.

In the drawing, the numeral 15 designates generally a preferred embodiment of phonograph apparatus including a mechanical motor indicated generally by the numeral 16 whose spiral spring 17 drives the shaft 18 when said spring is wound up by means of the thumb-piece 19 and let free to unwind. Said shaft 18 carries the gear 20 which by engagement with a train of gearing denoted generally as 21, drives the shaft 22 at an increased speed and hence rotates the phonograph record 23 which is mounted at a free end of said shaft 22. Any suitable governor means as is well known in the art and indicated at 24, is driven by the gearing 25 to avoid variances in the record's speed. The pick-up arm designated generally by the numeral 26 comprises a thin springy strip 27 pivotally mounted on the frame 28 at 29 at one of its ends and at its other end, said strip is welded or otherwise suitably secured to a metal cup 30 having a diaphragm 31 from which extends the stylus 32. The diaphragm is held as a cover for said cup 30 by means of the bent tabs 34 which extend upwardly from the rim of said cup. The stylus 32 extends through the cup, through hole 33 in the cup's bottom and thence with its point into a sound groove on the record 23. The stylus is of course fixed to said diaphragm and such assembly serves when the record is rotating, to translate the resulting vibrations of the stylus as determined by the sound groove 23', into sound, which is well known.

So that the spring 17 shall never "run down" to affect proper operation, its extent of unwinding is limited by providing the prongs 35, 35', 35'', 35''' which are struck down from the gear 20 to intercept the outermost convolution of said spring; the extent of unwinding permitted being designed to allow one play of the entire record or more preferably. Said prongs, here equi-spaced, also constitute part of the brake means to stop the motor 16 at the completing of play of each record lane respectively, in cooperation with the spring-biased lever 36 which presents the dog 37 adapted to intercept the prongs in succession as to be released by pressing and then releasing the button 38 to allow the motor to operate until said dog intercepts the next prong approaching it. The run of the motor between successive interceptions of its prongs, is just enough to play one record lane.

To shift the pick-up arm 26 back to the start of the record 23, or to the start of any lane already played, there is a reset means. This comprises the spring-loaded button 40 to which by a loose connection at 41, there is pivoted the end of a blade member 42, which serves to lift the pick-up arm off the record and reset it at a position at or towards the beginning of the record. Said reset member 42 has a notch 43 whose edge 43′ contacts the underside of the springy element 27 to lift the pick-up arm 26 off the record 23 when said button 40 is pushed, while the inclined edge 44 acts as a cam against the end edge 45 of the slot 46 in the frame member 28, to shift said pick-up arm. Said reset member 42 extends through said slot in which it is slidable.

To select which record lane is to be played, I provide the selector mechanism indicated generally by the numeral 47 which is really a means to stop the pick-up arm 26 when it is shifted towards the beginning of the record 23 by the reset member 42, to be at the start of the lane chosen, which is the case when the chosen lane is between the stylus 32 and the start of the record, or such selector means is called upon to shift the pick-up arm to the start of a lane which is between the stylus and the end of the record. In the first instance, the reset member 42 lifts the pick-up arm and shifts it to position. In the latter instance, I provide that in setting the selector member 48, it should lift the pick-up arm 26 off the record while it is being moved across the record to the chosen lane starting point, as will be explained.

Said selector mechanism 47 comprises a polygonal block which is the selector member 48 on the rotatably mounted shaft 49 having a comparatively large gear 50 which is driven by a smaller gear 51 turned by the knob 52. Turning such knob, presents successive faces of said blocks in the path of the strip springy element 27. The respective distances from the center of the shaft 49 to said faces are such that when said element 27 is against and along a face, the stylus will be positioned at the start of a particular record lane, and hence there are as many faces on said block 48 as there are lanes on the record 23. Said block has a pin extending from each face thereof, as 5′, which pin geometrically speaking, is tangent to the plane of that face which is next to the face the pin extends from, whereby successive pins are in divergent relation. The block surfaces are indicated at 1–6 and said associated pins at 1′–6′ respectively. The gear 50 carries a springy detent 60 for engagement in any of the holes 1″–6″ in the frame piece 18′, to determine which face of the block 48 is presented to act as a stop for the pick-up arm 26. Each of said holes bears the numeral of the face it sets as a stop, which numeral is here double primed for identification, as for instance, if the block face 3 is to act as the stop, the detent 60 would be set to engage the hole 3″; the pointer 61 on the shaft 49, being in line with said detent to indicate the record lane chosen for play.

Since it is contemplated that this phonograph apparatus be included in toys, animated or still displays, advertising devices and the like, besides per se, all controls, meaning the spring wind-up key 19, the brake release button 38, the selector knob 52 and the button 40 to transport the pick-up arm 26 to be reset to lane's start position, are all accessible at the outer face of the frame member 28. I also provide an auxiliary shaft 62 driven by the motor 16, for connection by any suitable coupling at end 62′ for driving for instance, a part of an animated display device in which this phonograph 15 might be incorporated.

The apparatus as shown in the drawing, is in condition to be made to play the first lane indicated at 1‴ which is the outermost lane of the record 23, because springy piece 27 is in contact with the face 1 of the block 48 and hence the stylus 32 engages the record at the commencement of said lane. The motor's spring 17 is of course wound up by means of the key 19.

To operate, press the button 38 to release the dog 37 from the prong 35, whereupon the motor 16 will run. Such button 38 is now released to return the dog 37 to normal rest position in the locus of movement of the prongs on 20, which is caused by action of the stressed torsion spring 63. As soon as the motor starts running, the lane 1‴ will be played and at the completion of such play, meaning when the stylus 32 reaches the end of said lane 1‴, the dog 37 will intercept the prong 35′ and the motor will stop. Now, if the brake release button 38 is again operated, the motor will run and the next lane 2‴ on the record will be played. This can be repeated for the remainder of the record.

Upon pressing the button 40 at the end of play of any lane, without changing the position of the block 48, the pick-up arm 26 will be lifted by the reset member 42 and due to the cam action offered by the cooperation of the slanted edge 44 with the edge 45, the pick-up arm will be swung on the axis 29 until the springy strip 27 contacts the face 1 of the block 48. Now, upon release of the button 40, the pick-up arm 26 moves towards the record 23 and the stylus 32 will again be in engagement with the commencement of the sound groove of the lane 1‴.

If at the end of play of any lane, it is desired to replay a lane which was played, then first turn the selector knob 52, to position the block 48 to present its appropriate stop face to be in position to intercept the springy piece 27. Then press the button 40, whereupon the pick-up arm 26 will be transported to the desired start position. Release hold of said button 40, and the apparatus is ready to play upon manipulation of the button 38. It is evident at this point in this specification, that from any rest position of the stylus, which is of course when the motor 16 is at rest, the machine can be set to play any lane between said stylus and the start of the record 23, because the reset means can transport the pick-up arm only towards the start of the record.

From any rest position of the stylus 32, it can be brought to the commencement of any lane between the stylus and the end of the record, by turning the knob 52 to position the block 48 to present its appropriate stop face to be in position against the springy piece 27. Of course, the turning of the block will shift the pick-up arm 26 towards the end of the record, but I provide that during each interval that the said block 48 is in movement to present its next face at the springy piece 27, the pick-up arm shall be off the record 23. This is accomplished by camming means which in the embodiment illustrated comprises the slant surface 27′ on piece 27, which surface cooperates successively with the pins 1′–6′ whereby each time any such pin contacts said slant surface 27′, the pick-up arm 26 will be raised.

To explain this camming action, consider the apparatus in rest condition as illustrated in the drawing. Should you want to set the stylus to play the third lane, which is lane 3‴, then turn the selector knob 52 to bring face 2 of the block 48 against the springy piece 27. While said piece 27 is shifted, the pin 2′ which is below said piece, in contacting the slant surface 27′, will raise the pick-up arm off the record 23, but let it down again onto the record when the face 2 contacts said piece 27. This places the stylus 32 into engagement with the commencement of the sound track of lane 2‴, and the pin 3 will enter below the said piece 27 ready to lift the pick-up arm again upon turning the selector knob 52 to bring the detent 61 into the hole 3″ whereupon the block 48 will be turned until its face 3 is against said piece 27 and pin 3 will raise it and then allow it to return to normal rest position so that the stylus will be in engagement with the commencement of the sound groove of lane 3.

It is evident therefore that at any rest position of the pick-up arm 26, the selector knob can be set to place such arm at the commencement of any lane. Of course, the knob 52 which is for selection of the lane to be played, need be turned counterclockwise in FIG. 2. So I have provided that if it be turned clockwise, meaning attempted to be so turned, that the pin 6, or any other pin which may be in the position of pin 6 in FIG. 2, would be on top of the springy piece 27 and hit against the incline or bend in said piece and exert a force dead center with the pivot 29 and thus stop movement. Better yet, I provide the ratchet and pawl shown at 65 as a positive way to allow only a counterclockwise movement of the block 48. The numeral 66 denotes a blade spring acting on the pawl.

Of course, there are sufficient faces on the block 48 for positioning the stylus at the commencement of each of the lanes of the record 23 and it is to be noted that if a face be provided to hold the stylus at the end of the record, it will hold the pick-up arm 26 from movement across the record when set in said arm's path. This is desirable to avoid injury of the record when the apparatus is in shipment and until the article is sold to the ultimate user.

I wish to note, that if desired, the reset means shown in FIG. 6 and also the pins 1′–6′ on the block 48 may be omitted. In such instance, let the pick-up arm 26 be accessible for manual manipulation and the device so altered may be worked as follows. First lift the pick-up arm off the record 23 and shift it to set the stylus in one of the innermost grooves on the record. Then set the selector by turning the knob 52 so that the face of the block 48 determining the lane to be played is in position to be in the path of the springy piece 27. Now lift the pick-up arm 26 and bring it over so that it contacts the chosen face. Leave go of the pick-up arm so the stylus 32 will contact the record. To play, push the button 38.

This invention is capable of numerous forms and various applications without departing from the essential features herein disclosed. It is therefore intended and desired that the various embodiments and constructions herein shall be deemed illustrative and not restrictive and that the patent shall cover all patentable novelty herein set forth; reference being had to the following claims rather than to the specific description herein to indicate the scope of this invention.

I claim:

1. In a phonograph apparatus, a frame, a phonograph record revolvably mounted on the frame, a gear train arranged to turn said record; said gear train including a drive shaft associated with a spiral spring which is adapted to be wound up and when unwinding, will drive said shaft, a pick-up arm comprising a springy strip element swingably mounted at one of its ends on the frame, for movement across the record and a means including a stylus associated with a diaphragm at the other end of said strip element, adapted when the record is turning and said stylus is in contact with a sound groove on the record, to translate vibrations of the stylus into sound; said strip element being biased so that the said stylus normally contacts the record, a wheel turning with said gear train, having a predetermined number of lugs extending therefrom and a dog element movably mounted on the frame, positioned in the path of lug movement and shiftable away from such path, whereby on interception of a lug, rotation of said drive shaft is stopped and when said dog element is shifted out of contact with the lug it has last intercepted, said shaft is again free to be rotated by action of said spring; said wheel being stopped by said dog element coming into contact with a lug, when the stylus is positioned at predetermined different distances from the end of the record respectively; the unwinding of said spring being sufficient to turn the record so that the stylus shall travel from the beginning to the end of said record.

2. A phonograph apparatus as defined in claim 1, including means biasing said dog element to be in said path.

3. A phonograph apparatus as defined in claim 1, wherein said wheel has a plurality of lugs in equi-spaced relation.

4. A phonograph apparatus as defined in claim 3, wherein said wheel and spiral spring are concentric and said lugs are spaced around a circle about the drive shaft; said lugs extending into the path of the unwinding spring and adapted to intercept said spring to halt its unwinding while said spring is still in partly wound condition.

5. A phonograph apparatus as defined in claim 1, including a stop element on the frame, positioned to be contacted by said springy strip element when the stylus is at the beginning of the record; said strip element moving away from said stop element as the stylus moves towards the end of the record and a means on the frame for moving said strip so that the stylus leaves the record and is shifted by said means against said stop element; said means being biased to a normal rest position where it would engage said spring strip element when the stylus is at the end of said record.

6. A phonograph apparatus as defined in claim 5, wherein the stop element is selectively positionable on the frame so that it can be set to be contacted by said springy strip element when said strip element is shifted by said strip-moving means from the end of the record towards the beginning of the record, to any of the positions the stylus is at on the record when there is an interception of a lug by said dog element except to the position when the stylus is at the end of the record.

7. A phonograph apparatus as defined in claim 5, wherein the stop element is selectively positionable on the frame so that it can be set to be contacted by said springy strip element when said strip element is shifted by said strip-moving means from the end of the record towards the beginning of the record, to any of the positions the stylus is at on the record when there is an interception of a lug by said dog element including the position when the stylus is at the end of the record.

8. A phonograph apparatus as defined in claim 5, wherein said stop element is a block revolvably mounted on the frame; said block having faces about its axis of rotation, at such distances respectively from said axis, that that face thereof which is selectively brought into the path of said spring strip element, when contacted by said strip element, will position the stylus at one of said predetermined distances from the end of the record respectively.

References Cited by the Examiner

UNITED STATES PATENTS

| | | | |
|---|---|---|---|
| 1,906,943 | 5/33 | Fisher et al. | 274—1.4 |
| 3,082,006 | 3/63 | Ryan | 274—1.1 |

FOREIGN PATENTS

| | | | |
|---|---|---|---|
| 15,036 | 4/29 | Australia. | |

NORTON ANSHER, *Primary Examiner.*